United States Patent
Ohara

(10) Patent No.: US 10,695,996 B2
(45) Date of Patent: Jun. 30, 2020

(54) TIRE VULCANIZATION MOLD

(71) Applicant: TOYO TIRE CORPORATION, Itami-shi, Hyogo (JP)

(72) Inventor: Masaaki Ohara, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 16/327,103

(22) PCT Filed: Sep. 28, 2016

(86) PCT No.: PCT/JP2016/004380
§ 371 (c)(1),
(2) Date: Feb. 21, 2019

(87) PCT Pub. No.: WO2018/061051
PCT Pub. Date: Apr. 5, 2018

(65) Prior Publication Data
US 2019/0193355 A1    Jun. 27, 2019

(51) Int. Cl.
*B29D 30/06* (2006.01)
*B29C 33/10* (2006.01)
(Continued)

(52) U.S. Cl.
CPC .......... *B29D 30/0606* (2013.01); *B29C 33/10* (2013.01); *B29C 35/02* (2013.01);
(Continued)

(58) Field of Classification Search
CPC .............. B29D 30/0606; B29D 30/72; B29D 2030/0616; B29D 2030/0617; B29D 2030/062
See application file for complete search history.

(56) References Cited

U.S. PATENT DOCUMENTS 5,382,402 A * 1/1995 Espie ................. B29C 33/10
156/394.1
6,491,854 B1* 12/2002 Sano ................. B22D 19/00
164/24
(Continued)

FOREIGN PATENT DOCUMENTS

JP     63-264308 A    11/1988
JP     11-333844 A    12/1999
(Continued)

OTHER PUBLICATIONS

International Search Report dated Nov. 1, 2016, issued in counterpart International Application No. PCT/JP2016/004380 (1 page).
(Continued)

*Primary Examiner* — James P Mackey
(74) *Attorney, Agent, or Firm* — Westerman, Hattori, Daniels & Adrian, LLP

(57) ABSTRACT

A tire vulcanization mold 10 of an embodiment includes a side mold 14 having a side molding surface 20 for molding a side wall portion. The side mold 14 includes: a side mold body 24 having a plurality of recesses 30 provided at intervals in a tire circumferential direction; a plurality of side pieces 26 fitted into the recesses 30 and forming an annular side molding surface 20 together with the side mold body 24; and a plurality of vent gaps 28 provided between side surfaces 26A on both sides in the tire circumferential direction of the side pieces 26 and wall surfaces 30A of the recesses 30. An inner end 26E in a tire radial direction of the side piece 26 is positioned inwardly in the tire radial direction from an inner end 20E in the tire radial direction of the side molding surface 20.

5 Claims, 6 Drawing Sheets

(51) Int. Cl.
    *B29C 35/02*     (2006.01)
    *B29L 30/00*     (2006.01)
    *B29D 30/72*     (2006.01)

(52) U.S. Cl.
    CPC ........ *B29D 30/72* (2013.01); *B29D 2030/062* (2013.01); *B29D 2030/0612* (2013.01); *B29D 2030/0616* (2013.01); *B29D 2030/0617* (2013.01); *B29D 2030/0618* (2013.01); *B29L 2030/00* (2013.01)

(56) References Cited

U.S. PATENT DOCUMENTS

| | | | |
|---|---|---|---|
| 7,021,914 B2 * | 4/2006 | Hanya | B29C 33/10 |
| | | | 249/141 |
| 2007/0259063 A1 * | 11/2007 | Tanaka | B29C 33/10 |
| | | | 425/36 |

FOREIGN PATENT DOCUMENTS

| | | |
|---|---|---|
| JP | 2000-202832 A | 7/2000 |
| JP | 2001-179751 A | 7/2001 |
| JP | 2010-533081 A | 10/2010 |
| JP | 2012-135897 A | 7/2012 |
| WO | 2009/007790 A1 | 1/2009 |

OTHER PUBLICATIONS

Third Party Observation dated Mar. 10, 2020, issued in JP Application No. 2018-541724 (Counterpart to U.S. Appl. No. 16/327,098;) with English translation. (21 pages).

Non-Final Office Action dated Mar. 30, 2020, issued in U.S. Appl. No. 16/327,098 (8 pages).

Non-Final Office Action dated Apr. 1, 2020, issued in counterpart U.S. Appl. No. 16/327,008 (10 pages).

Office Action dated May 12, 2020, issued in JP Application No. 2018-541725 (Counterpart to U.S. Appl. No. 16/327,008:), with English translation (12 pages).

Office Action dated May 12, 2020, issued in JP Application No. 2018-541724 (Counterpart to U.S. Appl. No. 16/327,098;), with English translation (8 pages).

* cited by examiner

TIRE VULCANIZATION MOLD

TECHNICAL FIELD

An embodiment of the present invention relates to a tire vulcanization mold for vulcanization molding a tire.

BACKGROUND ART

The tire is manufactured by preparing an unvulcanized green tire and vulcanizing the green tire using the tire vulcanization mold while molding it into a predetermined shape. As the tire vulcanization mold, there are known a tread mold for molding a tread portion of the tire, an upper and lower pair of side molds for molding a side wall portion of the tire, and an upper and lower pair of bead rings for molding a bead portion of the tire.

In such a tire vulcanization mold, it is known that molding defects such as a recess (bare) occur on an outer surface of the tire due to accumulation of air between the tire vulcanization mold and the green tire, and it is required to discharge the air accumulated between the mold and the green tire in order to suppress the molding defects.

Therefore, the following Patent Literature 1 proposes the tire vulcanization mold with a ring-shaped side mold formed by connecting a plurality of side segments divided in a tire circumferential direction in the tire circumferential direction. In this mold, a plurality of gaps extending in a tire radial direction is formed on a side molding surface by mating surfaces of the side segments, so that the air present between the green tire and the side mold is discharged from the gaps.

CITATION LIST

Patent Literature

Patent Literature 1: JP-A-2012-135897

SUMMARY OF THE INVENTION

Technical Problem

However, in the tire vulcanization mold described above, since the side mold having the side molding surface is formed by connecting the plurality of side segments to each other, dimension errors present in the individual side segments and assembling errors occurring when the side segments are connected to each other are accumulated. Therefore, since it is difficult to accurately form the gaps for discharging the air on the side molding surface, there is a problem that the molding defects tend to occur such that rubber sticks out because the gap is too wide, or the recess is generated on the outer surface of the tire because the gap is too narrow and venting performance is insufficient.

In view of the above, an object of the embodiment of the present invention is to provide the tire vulcanization mold capable of suppressing molding defects by accurately providing on the side molding surface, a vent gap for discharging the air present between the green tire and the side mold.

Means for Solving the Problems

An embodiment of the present invention is a tire vulcanization mold including: a tread mold having a tread molding surface for molding a tread portion of a tire; an annular side mold having a side molding surface for molding a side wall portion of the tire; and an annular bead ring having a bead molding surface for molding a bead portion of the tire. The side mold includes: a side mold body having a plurality of recesses provided at intervals in a tire circumferential direction on the side molding surface; a plurality of side pieces respectively fitted into the plurality of recesses and forming the side molding surface having an annular shape together with the side mold body; and a plurality of vent gaps for discharging air, extending in a tire radial direction, and provided between side surfaces on both sides in the tire circumferential direction of the plurality of side pieces and wall surfaces of the recesses facing the side surfaces. An inner end in the tire radial direction of the side piece is positioned inwardly in the tire radial direction from an inner end in the tire radial direction of the side molding surface.

In an embodiment, the side mold body may include a bead ring fixing portion for fixing the bead ring on an inner side in the tire radial direction of the side molding surface. The inner end in the tire radial direction of the recess may extend to the bead ring fixing portion. The inner end in the tire radial direction of the side piece fitted into the recess may be covered by the bead ring fixed to the bead ring fixing portion from an axially inner side of the tire.

In another embodiment, a gap may be provided between the inner end in the tire radial direction of the side piece and an inner end in the tire radial direction of the recess, and the gap between the inner ends may be set larger than the vent gaps on both sides in the tire circumferential direction of the side piece. In this case, corner portions at both ends in the tire circumferential direction at the inner end in the tire radial direction of the side piece may be formed in a curved surface shape having a radius of curvature of 2 mm or more.

In another embodiment, the side molding surface may include a groove provided along the vent gap.

Advantage of the Invention

In the present embodiment, since a plurality of side pieces are fitted into the recesses provided in the side mold body to form the side molding surface, and the side pieces are not directly connected to each other, it is possible to accurately provide the vent gap for discharging the air between the side piece and the side mold body. Further, since the inner end in the tire radial direction of the side piece is positioned inwardly in the tire radial direction from the inner end in the tire radial direction of the side molding surface, that is, positioned outside the side molding surface, accurate alignment with the side mold body is not required in the inner end. Therefore, it is possible to use the gap between the side mold body and the inner end as an allowance for strictly setting the vent gaps on both sides in the tire circumferential direction of the side piece, thereby improving dimensional accuracy of the vent gap.

MODE FOR CARRYING OUT THE INVENTION

Hereinafter, embodiments will be described with reference to the drawings.

Figure 1:
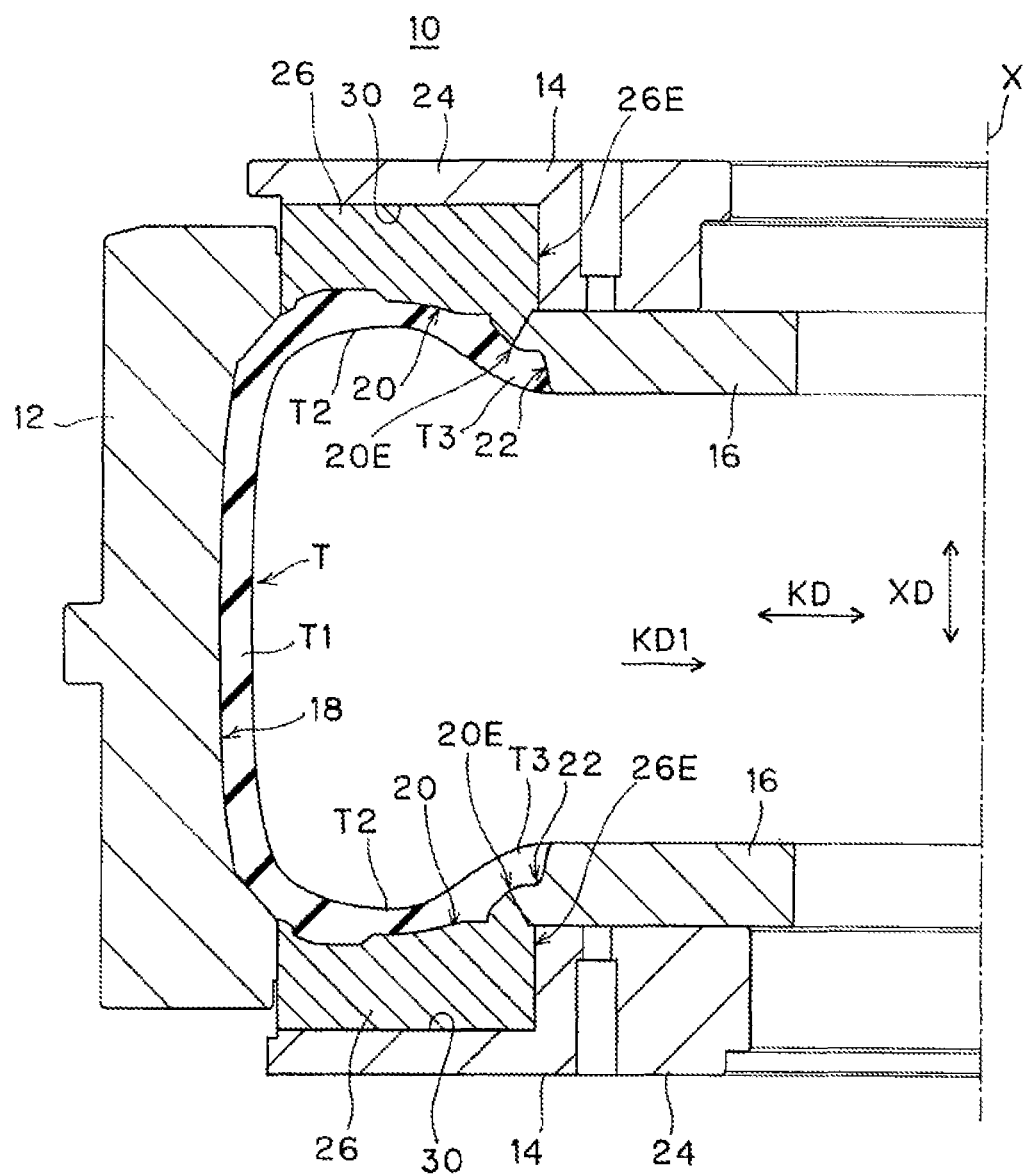
FIG. 1 is a half cross-sectional view showing a state of a tire vulcanization mold according to a first embodiment at the time of vulcanization.

FIG. 1 is a view showing a tire vulcanization mold (hereinafter simply referred to as a vulcanization mold) 10 according to a first embodiment, which is used for vulcanization molding a pneumatic tire T. The vulcanization mold 10 is a mold for vulcanization molding an unvulcanized green tire by setting its axial center X (the same as an axial center of the vulcanization mold 10) in a vertical direction, and includes a tread mold 12 for molding a tread portion T1 of a tire T, an upper and lower pair of side molds 14, 14 for molding side wall portions T2 of the tire T, and an upper and lower pair of bead rings 16, 16 for molding bead portions T3 of the tire T, to form a cavity which is a molding space of the tire T.

The tread mold 12 is a mold having a tread molding surface 18 for molding the tread portion T1, and is composed of a plurality of sectors divided in a tire circumferential direction. The plurality of sectors is provided to be expandable, contractible and displaceable in a tire radial direction (tire radial direction KD), and in a mold closed state, sectors adjacent in the circumferential direction are gathered together to form an annular shape.

The upper and lower side molds 14, 14 are annular, more specifically, thick-walled hollow disc-shaped molds, and are respectively provided on an inner peripheral side at both end portions in a tire axial direction XD of the tread mold 12. The upper and lower side molds 14, 14 have side molding surfaces 20, 20 for respectively molding the upper and lower side wall portions T2, T2.

The upper and lower bead rings 16, 16 are annular molds configured such that the bead portions T3 of the tire T are fitted therein, and are respectively provided on the inner peripheral side and an inner side of the tire axial direction of the upper and lower side molds 14, 14. The upper and lower bead rings 16, 16 have bead molding surfaces 22, 22 for respectively molding upper and lower bead portions T3, T3.

Figure 2:
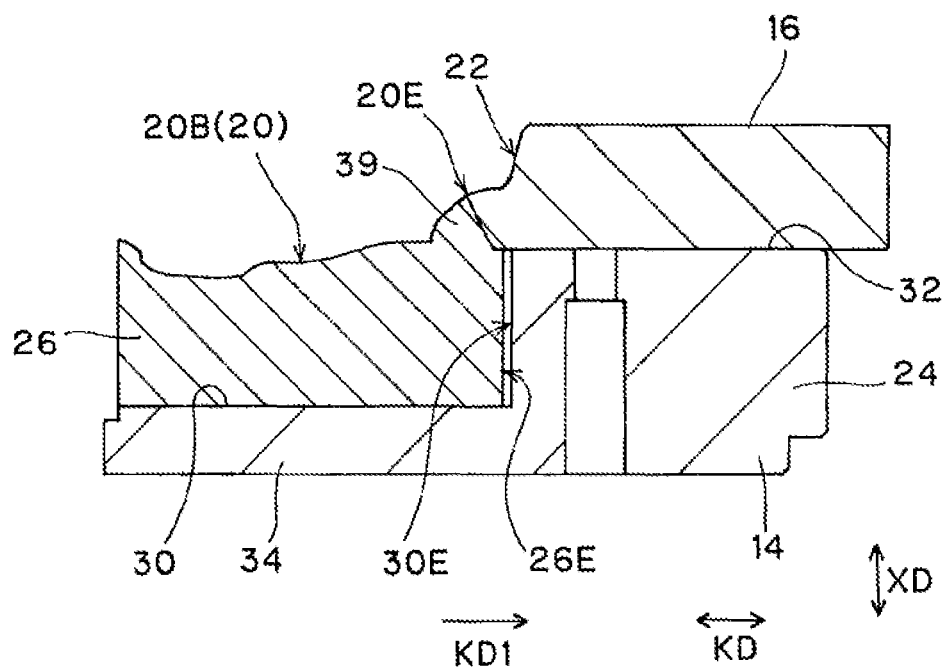
FIG. 2 is an enlarged cross-sectional view of a main portion of the tire vulcanization mold.
Figure 3:
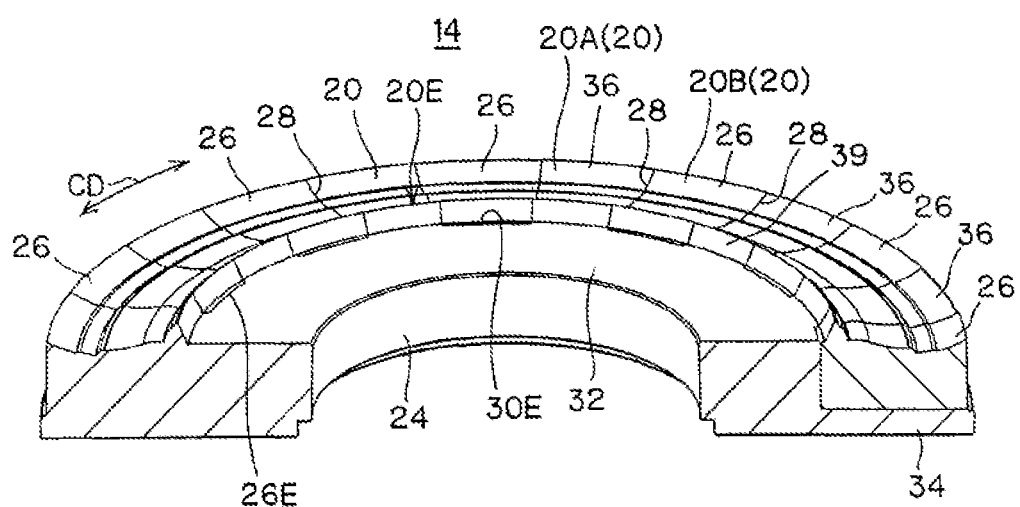
FIG. 3 is a perspective cross-sectional view of a side mold in the first embodiment.
Figure 4:
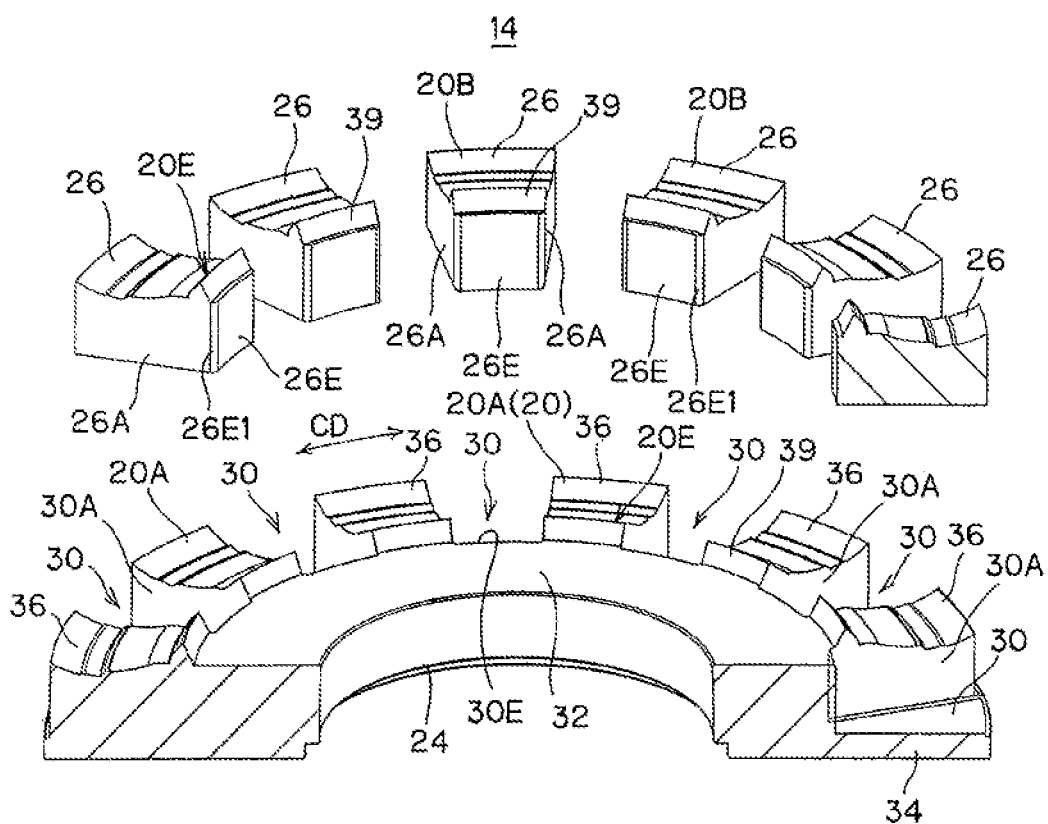
FIG. 4 is a perspective cross-sectional view showing the side mold in disassembly.

As shown in FIGS. 2 to 4, the side mold 14 includes a side mold body 24, a plurality of side pieces 26, and a plurality of vent gaps 28. Note that FIGS. 2 to 7 show the lower side mold 14, and the lower side mold 14 will be described also in the following description. Since the upper side mold 14 basically has the same structure with the lower side mold 14, a description thereof will be omitted.

The side mold body 24 has a plurality of recesses 30 provided at intervals in a tire circumferential direction CD in the side molding surface 20. Specifically, the side molding surface 20 having an annular shape is provided in an outer portion in the tire radial direction of the side mold body 24 having a hollow disc-shape, and an annular bead ring fixing portion 32 for fixing the bead ring 16 is provided on the inner side in the tire radial direction of the side molding surface 20, that is, in an inner portion in the tire radial direction of the side mold body 24. The bead ring 16 is placed on the bead ring fixing portion 32 and fixed to the side mold 14 by bolts or the like (not shown).

The plurality of recesses 30 for accommodating the side pieces 26 are provided at intervals in the tire circumferential direction CD in the side molding surface 20. A bottom surface of the recess 30 supporting the side piece 26 is constituted by a flat plate-like pedestal portion 34 forming a part of the side mold body 24. By providing the recesses 30, a protrusion 36 protruding upward from the pedestal portion 34 is provided between the recesses 30 adjacent to each other in the tire circumferential direction CD, and the recesses 30 and the protrusions 36 are alternately arranged in the tire circumferential direction CD.

Figure 5:
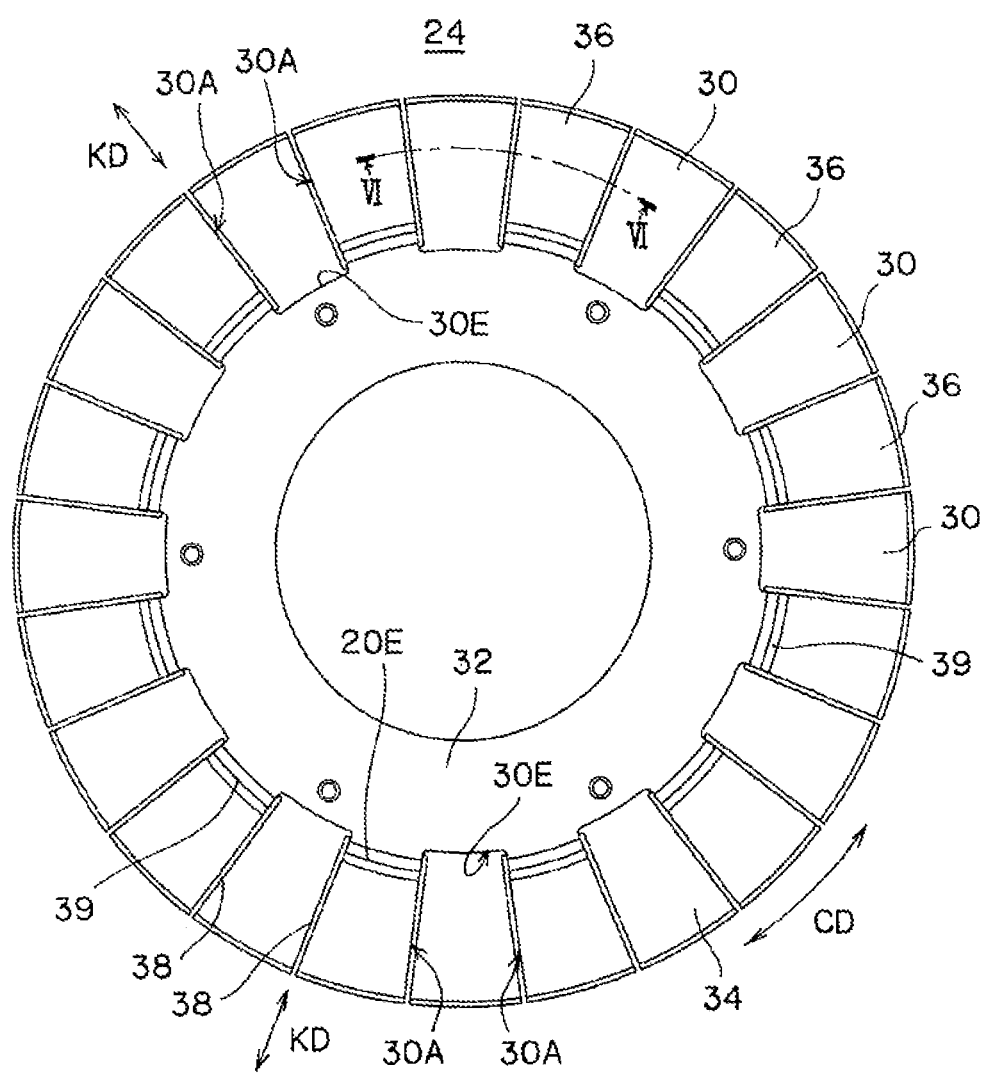
FIG. 5 is a plan view of a side mold body.

As shown in FIG. 5, the recess 30 is a recess which is open in a fan shape on the side molding surface 20 in a plan view (view in the tire axial direction), and specifically has, in a plan view, the fan shape composed of an arcuate portion on the inner peripheral side, an arcuate portion on an outer peripheral side, and a pair of linear portions connecting ends of the both arcuate portions and extending in the tire radial direction. In this example, an outer portion in the tire radial direction of the recess 30 is open to an outer surface in the tire radial direction of the side mold body 24.

The protrusion 36 is provided radially outward in the tire radial direction from the bead ring fixing portion 32. In this example, a wall surface 30A (the same as a side surface of the protrusion 36) of the recess 30 which is a boundary between the recess 30 and the protrusion 36 is provided to be aligned with the tire radial direction KD, and the protrusion 36 has a fan shape in a plan view. An upper surface of the protrusion 36 constitutes a part 20A of the side molding surface 20.

The side pieces 26 are respectively fitted into the recesses 30 of the side mold body 24, and constitute the side mold 14 having a ring shape together with the side mold body 24. Therefore, the side piece 26 has a fan shape in a plan view like the recess 30. The side piece 26 fitted into the recess 30 is fixed to the side mold body 24, specifically to the pedestal portion 34 by a bolt or the like (not shown).

An upper surface of the side piece 26 constitutes a part 20B of the side molding surface 20, and forms the side molding surface 20 having an annular shape together with a side molding surface 20A provided on the protrusion 36 of the side mold body 24. Specifically, the side molding surface 20 forms an annular shape continuous in the tire circumferential direction CD with the vent gaps 28 therebetween.

A length of the side piece 26 in the tire circumferential direction CD is slightly shorter than that of the recess 30. Therefore, in a state in which the side pieces 26 are fitted into the recesses 30, the vent gaps 28 extending in the tire radial direction KD are provided between the side surfaces 26A, 26A on both sides in the tire circumferential direction of the side pieces 26 and the wall surfaces 30A, 30A of the recess 30 facing the side surfaces. An upper end of the vent gap 28 is open to the side molding surface 20.

The vent gap 28 is a minute gap for discharging the air present between the green tire and the side molding surface 20 to the outside, and a dimension of the vent gap in the side molding surface 20 is set to such a dimension that the air passes therethrough but unvulcanized rubber does not intrude thereinto. As an example, a width of the vent gap 28 in the side molding surface 20 (distance between the side surface 26A of the side piece 26 and the wall surface 30A of the recess 30) is preferably 0.05 mm or less, may be 0.01 to 0.05 mm, and may be 0.01 to 0.03 mm.

Figure 6:
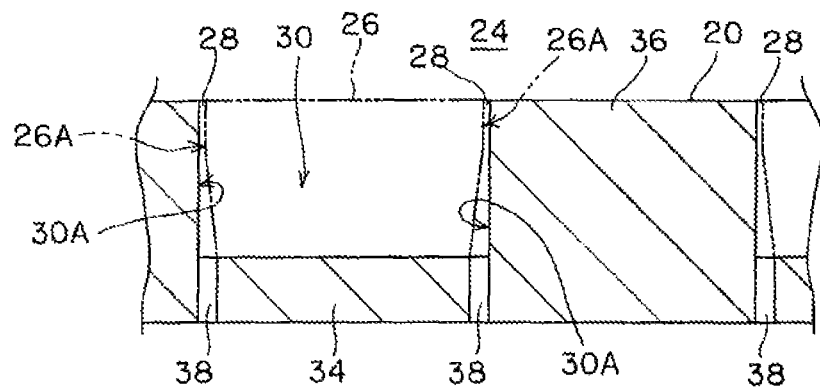
FIG. 6 is a cross-sectional view taken along a line VI-VI of FIG. 5.
Figure 7:
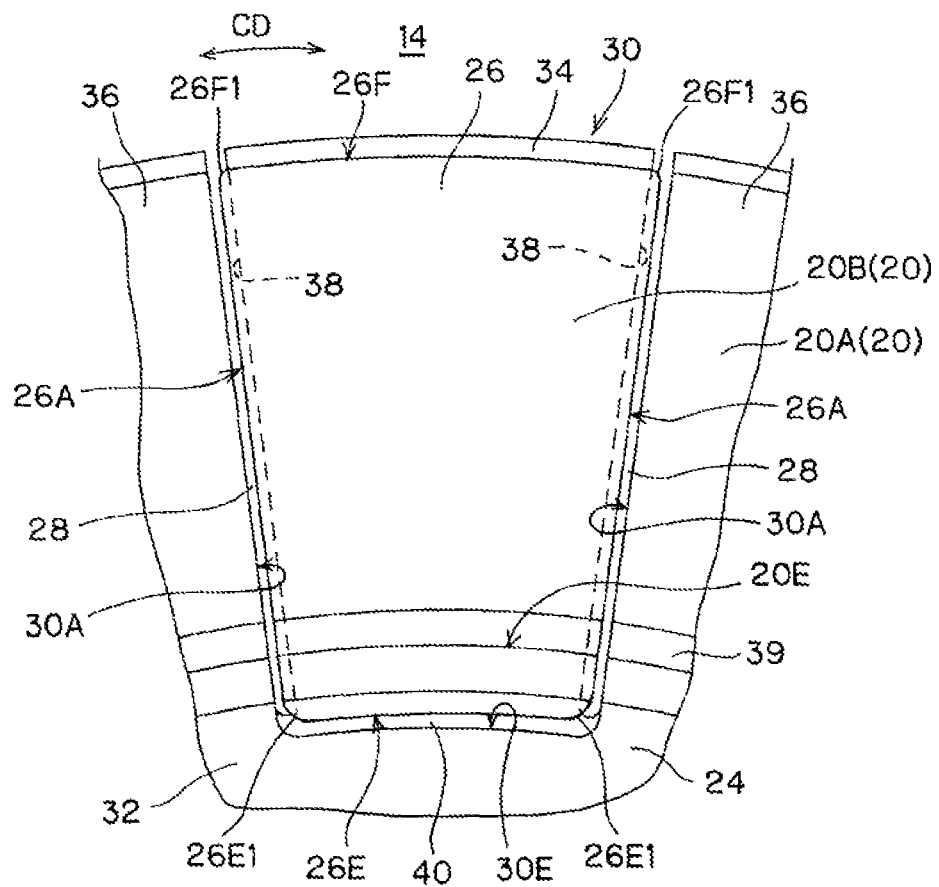
FIG. 7 is an enlarged plan view of a main portion of the side mold.

As shown in FIG. 6, slits 38 penetrating the pedestal portion 34 in a thickness direction thereof are provided in the bottom surface of the recess 30. The slits 38 are cuts provided wider than the vent gap 28 and extending in the tire radial direction KD along the wall surfaces 30A on both sides in the tire circumferential direction of the recess 30 as shown in FIGS. 5 and 7. An outer portion in the tire radial direction of the slit 38 is open to an outer surface in the tire radial direction of the pedestal portion 34. A lower end of the vent gap 28 is connected to the slit 38, and in this example, the vent gap 28 overlaps the slit 38 vertically over the entirety of the tire radial direction KD and is connected to the slit 38. The slit 38 is connected to a vent path (not shown), and the air present between the green tire and the side mold 14 flows into the vent path through the vent gap 28 and the slit 38, to be discharged to the outside of the tire vulcanization mold 10.

In the present embodiment, as shown in FIG. 2, an inner end 26E in the tire radial direction of the side piece 26 is positioned inwardly in the tire radial direction KD1 from an inner end 20E in the tire radial direction of the side molding surface 20. Here, the inner end 20E in the tire radial direction of the side molding surface 20 coincides with a mold dividing line in the cavity formed by the side mold 14 and the bead ring 16. Specifically, as shown in FIGS. 3 to 5, the recess 30 provided in the side mold body 24 extends to the bead ring fixing portion 32 beyond the inner end 20E in the tire radial direction of the side molding surface 20. That is, an inner end 30E in the tire radial direction of the recess 30 is positioned within the bead ring fixing portion 32. As shown in FIG. 2, the inner end 26E in the tire radial direction of the side piece 26 fitted into the recess 30 is covered from the inner side in the tire axial direction XD by the bead ring 16 fixed to the bead ring fixing portion 32, on the inner side in the tire radial direction of the inner end 20E of the side molding surface 20.

In this example, in the side mold 14, a protrusion 39 extending in the tire circumferential direction CD with the inner end 20E of the side molding surface 20 as an apex is provided on the tire molding surface 20. The plurality of recesses 30 are provided to divide the protrusion 39 in the tire circumferential direction CD, so that the protrusion 39 is intermittently provided on the side mold body 24 (see FIG. 5). Remaining portions corresponding to the protrusion 39 are formed in the side pieces 26, and by fitting the side pieces 26 into the recesses 30, the protrusion 39 is formed over the entire circumference in the tire circumferential direction CD.

As shown in FIG. 7, a gap (that is, an inner end gap) 40 is provided between the inner end 26E in the tire radial direction of the side piece 26 and the inner end 30E in the tire radial direction of the recess 30. Specifically, in a plan view shown in FIG. 7, the inner end 26E in the tire radial direction of the side piece 26 has an arcuate shape, and the inner end 30E in the tire radial direction of the recess 30 also has an arcuate shape. The gap 40 having a substantially constant width in the tire circumferential direction CD is provided between the two parts 26E and 30E. A clearance of the inner end gap 40 is set to be larger than that of the vent gaps 28, 28 on both sides in the tire circumferential direction of the side piece 26. As an example, while the vent gap 28 has a clearance of 0.05 mm or less, the inner end gap 40 is set to have a clearance of 0.5 mm or more, preferably about 0.5 to 1.0 mm.

Corner portions 26E1, 26E1 at both ends in the tire circumferential direction at the inner end 26E in the tire radial direction of the side piece 26 are formed in a curved surface shape having a radius of curvature of 2 mm or more. On the other hand, the radius of curvature of corner portions 26F1, 26F1 on both sides in the tire circumferential direction of an outer end 26F in the tire radial direction of the side piece 26 is set to be smaller than the radius of curvature of the corner portions 26E1, 26E1 on the inner diameter side, and the radius of curvature is set to, for example, 0.15 mm or less.

When the pneumatic tire T is manufactured using the vulcanization mold 10 prepared as described above, the green tire (unvulcanized tire) is set in the vulcanization mold 10 and the mold is closed, and then by inflating a bladder (not shown) disposed on the inside, the green tire is pressed against an inner surface of the mold and kept in a heated state, so that the green tire is vulcanization molded.

In this case, according to the present embodiment, it is possible to discharge the air present between the green tire and the side mold 14 to the outside through the slit 38 from the vent gap 28 formed between the side piece 26 and the side mold body 24. That is, it is possible to efficiently discharge the air from the plurality of vent gaps 28 provided in the tire circumferential direction CD, thereby suppressing molding defects due to the remaining air.

Further, although the side mold 14 is constituted by combining the plurality of side pieces 26, all the side pieces 26 are fixed to the side mold body 24, and thus errors of mounting positions generated when the plurality of side pieces are fixed to each other do not accumulate. Therefore, it is possible to accurately mount the side piece 26, thereby accurately setting a width dimension of the vent gap 28 formed between the side mold body 24 and the side piece 26.

In the present embodiment, when the side mold 14 is assembled, for example, the side piece 26 is fitted into the recess 30 of the side mold body 24, and in a state where a tape-like spacer called a shim tape having a predetermined thickness is sandwiched between the wall surface 30A of the recess 30 and the side surface 26A of the side piece 26, the side piece 26 is fixed to the side mold body 24 by the bolt or the like, and then it is possible to assemble the side mold 14 with or without removing the spacer. Therefore, it is possible to easily and accurately set the width dimension of the vent gap 30.

Moreover, in the present embodiment, since the inner end 26E in the tire radial direction of the side piece 26 is positioned inwardly in the tire radial direction KD1 from the inner end 20E in the tire radial direction of the side molding surface 20, that is, is not positioned within the side molding surface 20, accurate alignment with the side mold body 24 is not necessary at the tire radial direction inner end 26E of the side piece 26.

Therefore, the gap 40 with the side mold body 24 at the inner end 26E can be used as an allowance for strictly setting the vent gaps 28, 28 on both sides in the tire circumferential direction of the side piece 26. That is, for example, by setting the gap 40 larger than the vent gaps 28, 28 on both sides in the tire circumferential direction of the side piece 26, it is possible to absorb a positioning error of the side piece 26 using the gap 40. Therefore, it is possible to further improve dimensional accuracy of the vent gap 28.

Further, since precise fitting accuracy between the corner portion 26E1 on the inner diameter side of the side piece 26 and the corresponding corner portion of the recess 30 is not required, workability can be improved. Further, by setting the radius of curvature of the corner portion 26E on the inner diameter side of the side piece 26 to 2 mm or more, contact with the corresponding corner portion of the recess 30 can be suppressed. Meanwhile, by setting the corner portion 26F1 on the outer diameter side of the side piece 26 to be smaller than the radius of curvature of the corner portion 26E1 on the inner diameter side, it is possible to suppress the unvulcanized rubber from sticking out on the outer diameter side of the side piece 26.

Figure 8:
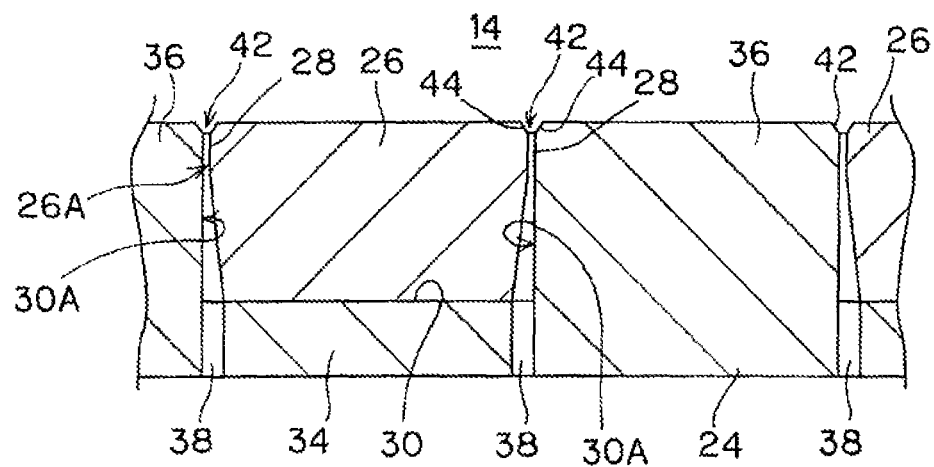
FIG. 8 is an enlarged cross-sectional view of a main portion of the side mold according to a second embodiment.

FIG. 8 is an enlarged cross-sectional view of a main portion of the side mold 14 according to a second embodiment. The second embodiment is different from the first embodiment in that the side molding surface 20 includes grooves 42 provided along the vent gap 28.

That is, a groove 42 extending in the tire radial direction is provided along a boundary line on the side molding surface 20 between the side surface 26A on both sides in the tire circumferential direction of the side piece 26 and the wall surface 30A of the recess 30 facing the side surface 26A. The groove 42 is formed over the entire length of the vent gap 28 so as to overlap the vent gap 28.

In this example, the grooves 42 are formed by chamfers 44, 44 made on both corner portions of the side piece 26 and the side mold body 24 facing each other with the vent gap 28 therebetween on the side molding surface 20. The chamfer 44 may be provided, for example, with a width of 0.5 mm or less and a depth of 0.5 mm or less. Although not shown, the groove 42 may be formed by rounding both the corner portions into a curved surface shape instead of the chamfer 44, and for example, it may be rounded with a quarter arc having a radius of curvature of 0.5 mm or less. As the groove 42, a groove having a semicircular cross-section or a groove having a rectangular cross-section may be provided. A dimension of the groove 42 is not particularly limited, and it may be, for example, 1 mm or less in width and 1 mm or less in depth.

It is possible to improve venting performance from the vent gap 28 by providing such a groove 42. Further, a protrusion is formed on the sidewall portion of the tire by providing the groove 42, however, it is possible to improve appearance of a parting line mark between the side mold body 24 and the side piece 26 by making the protrusion function as a design. Other structures and operational effects of the second embodiment are similar to those of the first embodiment, and description thereof will be omitted.

In the above embodiments, the outer portion in the tire radial direction of the recess 30 is provided open to the outer surface in the tire radial direction of the side mold body 24, however, it may be formed such that an annular wall continuous over the entire circumference in the tire circumferential direction is provided on an outer peripheral end portion of the side mold body 24, and the outer portion in the tire radial direction of the recess 30 is not open to the outer surface in the tire radial direction of the side mold body 24.

Further, the side piece 26 is not limited to a case where the plurality of side pieces 26 having the same length in the tire circumferential direction CD are provided at regular intervals, but the side pieces 26 having the same length in the tire circumferential direction CD may be provided at irregular intervals, or the side pieces 26 having different lengths in the tire circumferential direction CD may be provided at regular intervals or at irregular intervals. The same applies to the protrusions 36 between the recesses 30.

In the above embodiment, a vent structure by the side pieces 26 is provided for both of the upper and lower side molds 14, 14, however, the vent structure by the side pieces 26 may be provided for only one side mold 14 and another vent structure may be provided for the other side mold.

Although several embodiments have been described above, these embodiments have been presented by way of example and are not intended to limit the scope of the invention. These novel embodiments can be implemented in various other forms, and various omissions, substitutions, and changes can be made without departing from the scope of the invention.

DESCRIPTION OF REFERENCE NUMERALS AND SIGNS

T: pneumatic tire, T2: side wall portion, 10: tire vulcanization mold, 12: tread mold, 14: side mold, 16: bead ring, 20: side molding surface, 20E: inner end in tire radial direction of side molding surface, 24: side mold body, 26: side piece, 26A: side surface on both sides in tire circumferential direction of side piece, 26E: inner end in tire radial direction of side piece, 28: vent gap, 30: recess, 30A: wall surface of recess, 30E: inner end in tire radial direction of recess, 32: bead ring fixing portion, 42: groove, CD: tire radial direction, KD: tire radial direction, XD: tire axial direction.

The invention claimed is:

1. A tire vulcanization mold comprising:
a tread mold having a tread molding surface for molding a tread portion of a tire;
an annular side mold having a side molding surface for molding a side wall portion of the tire; and
an annular bead ring having a bead molding surface for molding a bead portion of the tire, wherein
the side mold comprises:
a side mold body having a plurality of recesses provided at intervals in a tire circumferential direction on the side molding surface;
a plurality of side pieces respectively fitted into the plurality of recesses and forming the side molding surface having an annular shape together with the side mold body; and
a plurality of vent gaps for discharging air, extending in a tire radial direction, and provided between side surfaces on both sides in the tire circumferential direction of the plurality of side pieces and wall surfaces of the recesses facing the side surfaces, and
an inner end in the tire radial direction of each side piece is positioned inwardly in the tire radial direction from an inner end in the tire radial direction of the side molding surface.

2. The tire vulcanization mold according to claim 1, wherein
the side mold body comprises a bead ring fixing portion for fixing the bead ring on an inner side in the tire radial direction of the side molding surface,
each recess extends beyond the inner end in the tire radial direction of the side molding surface to the bead ring fixing portion, and
the inner end in the tire radial direction of each side piece fitted into the respective recess is covered by the bead ring fixed to the bead ring fixing portion from an axially inner side of the tire.

3. The tire vulcanization mold according to claim 1, wherein
a gap is provided between the inner end in the tire radial direction of each side piece and an inner end in the tire radial direction of the respective recess, and
the gap between the inner ends is set larger than the vent gaps on both sides in the tire circumferential direction of each side piece.

4. The tire vulcanization mold according to claim 3, wherein corner portions at both ends in the tire circumferential direction at the inner end in the tire radial direction of each side piece are formed in a curved surface shape having a radius of curvature of 2 mm or more.

5. The tire vulcanization mold according to claim 1, wherein the side molding surface comprises a groove provided along each vent gap.

* * * * *